US005391426A

United States Patent [19]

Wu

[11] Patent Number: 5,391,426

[45] Date of Patent: Feb. 21, 1995

[54] POLYALKYLENEIMINE COATED MATERIAL

[75] Inventor: Huey S. Wu, Newark, Del.

[73] Assignee: W. L. Gore & Associates, Inc., Newark, Del.

[21] Appl. No.: 990,307

[22] Filed: Dec. 14, 1992

Related U.S. Application Data

[63] Continuation-in-part of Ser. No. 915,479, Jul. 16, 1992, abandoned, which is a continuation-in-part of Ser. No. 894,875, Jun. 8, 1992, abandoned, which is a continuation-in-part of Ser. No. 849,546, Mar. 11, 1992, abandoned.

[51] Int. Cl.[6] .......................... B32B 7/14; B32B 27/04

[52] U.S. Cl. .......................... 428/246; 428/260; 428/262; 428/315.9; 428/316.6; 428/319.3; 428/421; 428/244

[58] Field of Search ............ 428/245, 260, 262, 319.3, 428/421, 306.6, 308.4, 315.9, 316.6, 246

[56] References Cited

U.S. PATENT DOCUMENTS

| | | | |
|---|---|---|---|
| 2,399,027 | 4/1946 | Heribert | 428/246 |
| 4,113,912 | 9/1978 | Okita | 428/290 |
| 4,194,041 | 3/1980 | Gore et al. | 428/315 |
| 4,443,511 | 4/1984 | Worden et al. | 428/198 |
| 4,677,019 | 6/1987 | Von Blucher | 428/244 |
| 4,872,220 | 10/1989 | Haruvy et al. | 428/286 |
| 4,943,475 | 7/1990 | Baker | 428/246 |
| 5,024,594 | 6/1991 | Athayde et al. | 428/246 |
| 5,080,924 | 1/1992 | Kamel et al. | 427/2 |

FOREIGN PATENT DOCUMENTS

| | | |
|---|---|---|
| 0202996 | 11/1986 | European Pat. Off. . |
| 0247539 | 12/1987 | European Pat. Off. . |
| 0260840 | 3/1988 | European Pat. Off. . |
| 0260841 | 3/1988 | European Pat. Off. . |
| 0465817 | 1/1992 | European Pat. Off. . |
| 9103379 | 3/1991 | WIPO . |

OTHER PUBLICATIONS

Derwent Publications Ltd. AN 81-85899D & JP,A,56 127 648 (Mitsubishi Gas Chem Ind) 6 Oct. 1981.

Derwent Publications Ltd. AN 87-089925 & JP,A,62 039 637 (Mitsubishi Rayon) 20 Feb. 1987.

*Primary Examiner*—George F. Lesmes
*Assistant Examiner*—Blaine R. Copenheaver
*Attorney, Agent, or Firm*—Gary A. Samuels

[57] ABSTRACT

A material for absorbing noxious gases while having a good water vapor transmission rate is provided which comprises a suitable flexible substrate of a textile material or a porous organic polymeric membrane having a coating or film on it made of an organic polymer having active hydrogens which presumably react with reaction sites on the noxious gas compound.

8 Claims, 2 Drawing Sheets

POLYALKYLENEIMINE COATED MATERIAL

REFERENCE TO RELATED APPLICATIONS

This application is a continuation-in-part of application Ser. No. 07/915,479, filed Jul. 16, 1992, now abandoned, which is a continuation-in-part of application Ser. No. 07/894,875, filed Jun. 8, 1992, now abandoned, which is a continuation-in-part of application Ser. No. 07/849,546, filed Mar. 11, 1992, now abandoned.

FIELD OF THE INVENTION

This invention is related to protective covering materials that protect persons inside a garment, tent, sleeping bag or the like, or protects inanimate objects from noxious gases, while having a high water vapor transmission rate. More specifically, this invention is directed to water vapor permeable coated materials and coverings made from them which protect persons or contents from noxious gases, such as mustard gas and other noxious chemical agents.

BACKGROUND OF THE INVENTION

Protective garments that protect the wearer from body contact with harmful gases are known, but, in general, they tend to be bulky or heavy and/or non-breathable. By non-breathable is meant that the garments do not allow passage of water vapor, such as is in perspiration given off by the human body. Lack of breathability means that perspiration builds up inside the garment and results in a close, uncomfortable feeling to the wearer, as well as leading to heat stress in the body of the wearer.

In addition, many materials that absorb and adsorb noxious gases must be applied in heavy, or thick, amounts in order to be effective. Use of particulate carbon as an adsorbent can particularly result in heavy stiff fabric material as the amount of carbon present is increased.

It is desirable to develop a protective material useful in garments or other coverings that is breathable, lightweight, and flexible.

SUMMARY OF THE INVENTION

The protective covering of this invention is a composite of a) a pliable substrate that is permeable to water vapor and is preferably resistant to penetration by liquid water, and b) a gas-blocking water-vapor-permeable polymeric coating comprising a crosslinked polyalkyleneimine where the alkylene moiety is of 2–8 carbon atoms, said coating forming a gas-blocking barrier on said substrate and being present on said substrate in an amount between 2 and 250 $g/m^2$. By "gas-blocking" is meant that gases such as air or noxious gases are blocked from passing through the polymeric coating.

In one embodiment, the composite is combined with a facing and/or a backing fabric to provide protection to the composite.

Additional gas blocking materials can be present, as for example gas sorbing materials.

DETAILED DESCRIPTION OF THE INVENTION

Figure 1:
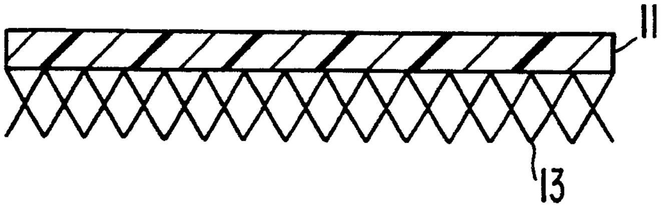
FIG. 1 depicts a composite of the invention in which polymeric coating 11 forms a coating on substrate 13.

The pliable substrate can be any water vapor-permeable material, such as a woven or nonwoven textile, or a knit fabric, a nonporous polymeric film or membrane, or a porous polymeric film or membrane, such as microporous polyethylene, polypropylene, or polytetrafluoroethylene. By porous is meant that the substrate has continuous, interconnected pores throughout its thickness from one side to the other. Thus, porous substrates include woven or nonwoven textiles and knit fabrics as well as porous polymeric films or membrane. Preferably, the pores are microporous, i.e. small enough to aid in preventing penetration by droplets of water. Nonporous substrates include Hytrel® polyether polyesters, polyether polyurethanes, and the like.

Preferably, the substrate will be expanded porous polytetrafluoroethylene that is composed of nodes interconnected by fibrils which form the pores, as taught in U.S. Pat. No. 4,187,390 or U.S. Pat. No. 3,953,566. Porosity, pore size, node shape, or fibril length is not critical in the substrates of this invention. In general, the substrate will be about 0.001 cm to 0.1 cm thick.

The polyalkyleneimines, especially polyethyleneimine, provide good water vapor transmission characteristics, but yet in continuous coating form provide a barrier to the passage of gases. Representative divalent alkylene groups include ethylene ($-CH_2-CH_2$) hexylene ($-CH_2-)_6$, and cyclohexylene.

Preferred polyethyleneimines are branched polyamines. They are usually produced from polymerization of ethylenimine, and commonly contain units represented by primary, secondary and tertiary amines.

Preferably, the alkylene portion of the imine can contain 2–8 carbon atoms and the recurring units can recur a number of times, e.g. 10–45 or more. The primary and secondary amino nitrogens provide reaction sites whereby the imine can be modified, as by alkylation. Preferably in this invention, these sites are partially modified by employing a crosslinking agent.

The crosslinking agent is preferably selected from the class consisting of polymeric polyepoxides, polybasic esters, aldehydes, formaldehydes, ketones, alkylhalides, isocyanates, organic acids, ureas, anhydrides, acyl halides, chloroformates, acrylonitrites, acrylates, methacrylates, dialkyl carbonates, thioisocyanates, dialkyl sulfates, cyanamides, haloformates, and melamine formaldehydes. A preferred crosslinking agent is a polyepoxide, such as biophenol A epoxy resin or bisphenol A elastomeric epoxy resin. The epoxides are preferred because it is thought that better control of the curing is achieved.

The polyimine forms a coating or a film on the surface of the substrate which is a nonporous, air-impermeable layer on the substrate. It can al so partially or fully impregnate the pores of the substrate when the substrate is porous. It also can be sandwiched as a continuous coating between two layers of substrate.

The composite is useful to combine with backing fabrics and/or facing fabrics to result in a material useful in making articles of clothing or other protective coverings. These backing or facing fabrics can be any protective material such as woven or nonwoven textiles, or knits. These fabrics can be treated with water and oil repellants or with the gas-blocking polymer, or with both. Fluoroacrylate water repellants are one preferred class of coating on the fabric. Representative fluoroacrylates are available from companies such as the Du Pont Company (Zonyl® compositions) or ICI Co. (Milease® compositions).

It is believed, but not fully understood, that reactive sites in mustard gas, or nerve gas, such as chlorine atoms in the chloroalkyl portion of the gas, react with active hydrogen in the polyimine or amine.

The coatings need not be applied to the substrate in large amounts to be effective and thus their use does not substantially decrease the pliability, or increase the weight, of the substrates.

Additional additives can be present as part of the composite of the invention. For example, elastomers can be added to impart flexibility to the coating. These include elastomeric acrylics, acrylonitrite, urethanes, polyvinyl chloride, latex rubbers, and the like.

Figure 2:
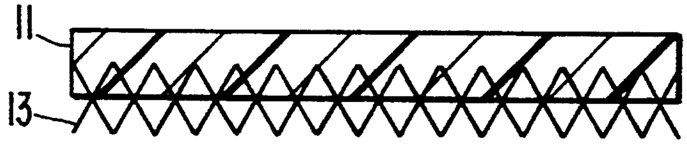
FIG. 2 depicts a composite of the invention where the polymeric coating 11 partially impregnates pores in substrate 13 as well as forms a coating on the surface.
Figure 3:
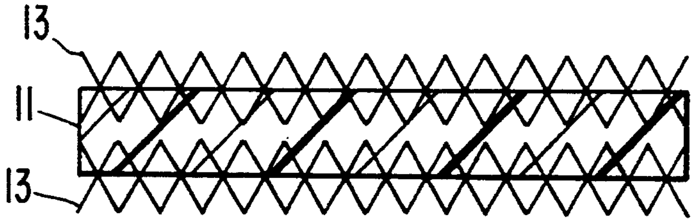
FIG. 3 depicts a composite of the invention where polymeric coating 11 is sandwiched between two substrates 13.
Figure 4:
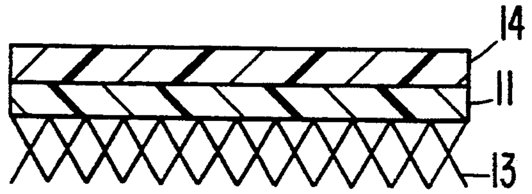
FIG. 4 depicts a composite of polymeric coating 11 with substrate 13 attached to backing (or facing) fabric 14.
Figure 5:
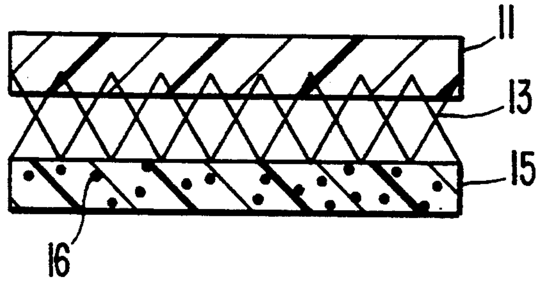
FIG. 5 depicts another composite of the invention.

The composite of this invention can additionally contain other gas sorbing materials, such as activated carbon, to enhance the effectiveness of the composite in blocking gases. The gas sorbing material can be present in or on the polymer coating or, as shown in FIG. 5, it can be present in a separate layer. In FIG. 5, the polymeric coating is 11, the substrate is 13 and 15 is a layer that carries gas sorbing material 16. Carrier layer 15 can be any water vapor-permeable material, such as a textile fabric, e.g. a knit or a nonwoven, a polyurethane sheet, a porous polymer, e.g. an expanded polytetrafluoroethylene membrane. This layer can be positioned adjacent substrate 13 in FIG. 1 or 2, adjacent both substrates 13 in FIG. 3. In addition, the layer can be protected by covering it with still another layer of substrate 13.

In addition, materials that react with gas to prevent passage of gas can be used in place of a gas sorbing material.

In one embodiment, the material comprises the following sequence of layers:

- polyester backing,
- pliable porous substrate of porous polytetrafluoroethylene,
- gas-blocking water-vapor-permeable polymeric coating (crosslinked polyethyleneimine),
- pliable porous substrate (same as above),
- polyurethane layer with activated carbon attached,
- a covering layer of porous polytetrafluoroethylene.

Water Vapor Transmission Rate (WVTR) of the composites can range from 2000 to 50,000 $g/m^2$ day, and water entry pressure resistance is greater than 0.077 $kg/cm^2$ for 5 min. The composites exhibit no passage of air through them when subjected to the Gurley test procedure for determining air flow through materials.

GENERAL PROCEDURE FOR PREPARING COATING COMPOSITION

To prepare the coating compositions used in the examples, polyethyleneimine is mixed with surfactants and a defoamer, if necessary. Then a polyepoxide crosslinking agent was mixed in by stirring with machine mixing. Water content of the mixture can be from 0% to 95% depending upon the coating thickness desired. Organic solvents may also be present in the mix. The composition was used promptly to avoid unintentional curing.

Coating and Curing Procedure Used in the Examples

The coating can be applied to a substrate material in any conventional way. It can be by hand with a knife edge or by machine, to form a thin 0.001 cm to 0.1 cm thick film, or by dipping the substrate into the coating. Loading of coating on the substrate can be between about 2 $g/m^2$ and 250 $g/m^2$, preferably 5–125 $g/m^2$, depending on the degree of flexibility desired and protection sought.

Usually another substrate layer is applied to the other side by pressing the coating between the two substrates.

The coating is cured by placing the coated material in an oven at about 110° C.–160° C. for about 60 seconds. At higher temperatures, the coating may decompose.

TEST PROCEDURES

Generally, 5-inch by 5-inch substrate samples of porous expanded PTFE having a porosity of about 75–80% and a weight of about 17 $g/m^2$ were used; and the coating substrate was about 2 mil (0.005 cm) thick. Two PTFE layers sandwiched the coating.

Mustard Gas Barrier Test

A. BREAKTHROUGH TEST

This test measures the time it takes for droplets of mustard gas to penetrate a composite sample of the invention. The test used is described in "Laboratory Methods For Evaluating Protective Clothing Systems Against Chemical Agents", complied by Mary Jo Waters at the U.S. Army Armament, Munitions & Chemical Command, Aberdeen Proving Ground, Md. 21010 USA in June 1984 at page 2-23 in paragraph 2.3.5, except that 10 drops of mustard gas were applied to the sample instead of 5, and no plastic disk was placed over the sample material. In addition, for safety, the test was carried out in a lab hood and the droplets allowed to evaporate.

B. DIFFUSION/TIME TEST

This test measures the amount of gas accumulating on the other side of the composite over the time period 0–2 hours from application of drops to the opposite side, and the amount of accumulation over the time period 2–4 hours, 4–6 hours and 6–24 hours.

The test is described in the same publication as described in A above in paragraph 2.2 and specifically in paragraph 2.2.2 and 2.2.5, except that the air was at 25° C.

Test for WVTR (Water Vapor Transmission Rate)

WVTR values were obtained following the procedure set forth in U.S. Pat. No. 4,862,730 using potassium acetate as the salt and carrying out the test at 23° C. and 50% relative humidity.

Water Entry Pressure Test

This test was carried out according to Federal Test Method 191A-5516 at 0.077 $kg/cm^2$ for 5 minutes.

Gurley Air Flow Test

The resistance of samples to air flow was measured by a Gurley densometer (ASTM D726-58) manufactured by W. & L. E. Gurley & Sons. The results are reported in terms of Gurley Number which is the time in seconds for 100 cubic centimeters of air to pass through 1 square inch of a test sample at a pressure drop of 4.88 inches of water.

EXAMPLES

Preliminary Testing of Component Materials

Films were made of each of the following:

A. polyethyleneimine resin (40% by wt. in water, polymin P from BASF), plus 0.2% Zonyl® FSN fluorosurfactant.

B. bisphenol A epoxy resin (WJ 5522, from Rhone-Poulenc, 40% by wt. in water) plus 0.2% by wt. Zonyl® FSN fluorosurfactant.

C. bisphenol A elastomer epoxy resin (W50-3519, from Rhone-Poulenc), 40% by wt. in water), plus 0.2% by wt. Zonyl® FSN fluorosurfactant.

The films were prepared by pressing the resins between two expanded PTFE membranes for 1 minute at 120° C. The films were 0.005 cm thick.

Each film was subjected to the Mustard Gas Breakthrough Test.

Results were as follows:

Film A: breakthrough time (two tests): 13 minutes/22 minutes.

Film B: breakthrough time (two tests): 3 minutes/3 minutes.

Film C: breakthrough time (two tests): 3 minutes/3 minutes.

EXAMPLE 1

Using the General Procedure, the following coating composition was prepared:

| Weight Percentages (%) | Chemical Names |
|---|---|
| 70.0 | Polyethylene imine (50% in water, polymin P, from BASF |
| 14.0 | Bisphenol A based epoxy resin (WJ5522, from Rhone-Poulenc, 54% solid in water) |
| 5.0 | Diethyl Adipate (DBE-6, from duPont) |
| 5.0 | 2-Propanol |
| 1.0 | Span-20 (sorbital monolaurate surfactant from ICI) |
| 0.2 | Zonyl FSN (fluorosurfactant from DuPont) |
| 0.2 | 30E silicone defoamer from Reliance Chemical Products, Inc. |
| 4.6 | Water |

The composition was coated onto a sheet of 0.005 cm thick porous expanded polytetrafluoroethylene (PTFE) obtainable from W. L. Gore and Associates, Inc. The sheet had a porosity of about 75–80%. As described above the coating composition was pressed between two PTFE sheets.

Coating was carried out by machine casting a layer onto the sheet of PTFE and then curing in a hot air oven at 120° C. for 1 minute.

Coating laydown was 15 g/m$^2$.

Mustard Gas Breakthrough Test results were: Breakthrough time (two tests) >1440 minutes, >1440 minutes.

WVTR dry of the cured coated sheet was 36000 g/m$^2$ day.

The coated product was tested for resistance to penetration by Soman nerve gas and was found to provide a barrier to penetration.

The coated product did not exhibit air flow when tested by the Gurley Test Method.

EXAMPLE 2

The following coating composition was prepared by the general procedure given above:

| Weight Percentages (%) | Chemical Names |
|---|---|
| 53.4 | Polyethylene imine (50% in water, polymin BASF) |
| 23.0 | Bisphenol A elastomer modified epoxy resin (W50-3519, 47% in water) from Rhone-Poulenc |
| 10.8 | Acrylic emulsion latex (TR-934) from Rohm & Haas |
| 3.0 | 2-Propanol |
| 0.2 | Synthrapol KB (polyoxethylene decyl ether (surfactant) from ICI |
| 0.2 | Zonyl FSN (fluorosurfactant) |
| 0.1 | 30E silicone defoamer |
| 9.3 | Water |

Coating and curing was carried out as in Example 1. The acrylic latex was used to impart flexibility to the composite.

Coating laydown was 20 g/m$^2$.

Mustard Gas Breakthrough Test results were: Breakthrough time: 603 minutes/603 minutes.

MVTR was 26000 g/m$^2$ day.

EXAMPLE 3

In this example, good flexibility was obtained by using a small molecular weight polyethyleneimine in the coating.

The following coating was prepared by the general procedure given above:

| Weight Percentages (%) | Chemical Names |
|---|---|
| 60.0 | Polymin P (polyethyleneimine, 50% in water, from BASF) |
| 1.0 | SP-012 (polyethyleneimine, 100%, M.W. 1200, from ACETO) |
| 0.2 | Synthrapol KB (surfactant) from ICI |
| 0.2 | Zonyl FSN (fluorosurfactant) |
| 0.1 | 30E (defoamer) |
| 12.0 | Water |
| 27.5 | W50-3519 (Bisphenol A elastomer epoxy resin, 47% in water) |

Coating laydown was 20 g/m$^2$.

Mustard Gas Breakthrough Test results: breakthrough time: 26 minutes and 46 minutes (two tests).

WVTR was about 27000 g/m$^2$ day.

EXAMPLE 4

In this example acrylonitrile copolymer was used as a flexibilizer in the coating. The following coating was prepared by the general procedure given above:

| Weight Percentages (%) | Chemical Names |
|---|---|
| 48 | Polyethyleneimine (Polymin P, 50%, in water, from BASF) |
| 14 | Bisphenol-A Based epoxy resin (WJ5522, 54% solid in water, from Rhone-Poulenc) |
| 32 | Acrylonitrile copolymer resin (Hycar 1561, 41% solid in water, from Goodrich) |
| 0.2 | Fluorosurfactant (Zonyl FSN, from duPont) |
| 0.2 | Defoamer (30E, from Reliance Chemical Products, Inc.) |
| 5.6 | Water |

The coating was applied as in Example 1 and a second layer of porous expanded PTFE sheet applied.

Coating laydown was 10 g/$m^2$.

WVTR was about 36,000 g/$m^2$ day.

Mustard Gas (HD) Diffusion/Time Test Results: less than 4 microgram (HD)/$cm^2$ in 24 hours.

EXAMPLE 5

In this example vinylchloride copolymer was used as a flexibilizer in the coating. The following coating was prepared by the general procedure given above:

| Weight Percentages (%) | Chemical Names |
|---|---|
| 48 | Polyethyleneimine (Polymin P, 50% in water, from BASF) |
| 14 | Bisphenol-A Based epoxy resin (WJ5522, 54% solid in water, from Rhone-Poulenc) |
| 32 | Vinylchloride copolymer resin (Geon 590X20, 49% solid in water, from Goodrich) |
| 0.2 | Fluorosurfactant (Zonyl FSN, from duPont) |
| 0.2 | Defoamer (30E, from Reliance Chemical Products, Inc.) |
| 5.6 | Water |

The coating was applied as in Example 1 and a second layer of porous expanded PTFE sheet applied.

Coating laydown was 10 g/$m^2$.

WVTR was about 31,000 g/$m^2$ day.

Mustard Gas (HD) Diffusion/Time Test Results: less than 25 microgram (HD)/$cm^2$ in 24 hours.

EXAMPLE 6

In this example a silicone emulsion was used as a flexibilizer in the coating. The following coating was prepared by the general procedure given above:

| Weight Percentages (%) | Chemical Names |
|---|---|
| 48 | Polyethyleneimine (Polymin P, 50% in water, from BASF) |
| 14 | Bisphenol-A Based epoxy resin (WJ5522, 54% solid in water, from Rhone-Poulenc) |
| 32 | Silicone emulsion (DC 108, 40% solid in water, from Dow Corning) |
| 0.2 | Fluorosurfactant (Zonyl FSN, from duPont) |
| 0.2 | Defoamer (30E, from Reliance Chemical Products, Inc.) |
| 5.6 | Water |

-continued

The coating was applied as in Example 1 and a second layer of porous expanded PTFE sheet applied.

Coating laydown was 10 g/$m^2$.

WVTR was about 21,000 g/$m^2$ day.

Mustard Gas (HD) Diffusion/Time Test Results: less than 250 microgram (HD)/$cm^2$ in 24 hours.

EXAMPLE 7

Figure 6:
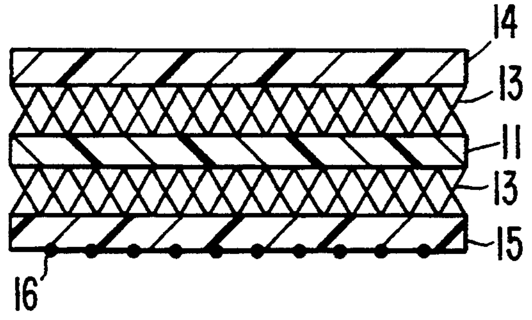
FIG. 6 depicts still another composite of the invention.

Referring to FIG. 6, in this example, the formulation in Example 2 was used to make a continuous polymeric coating 11 (20 g/$m^2$ laydown) sandwiched by two layers of expanded PTFE membranes 13. Then one side of the PTFE membrane was coated with a water vapor permeable polyurethane coating 15 with some activated carbon beads 16 adhered to it. The active carbon (Ambersorb, RH1500) was supplied by Rohm & Haas. Finally, a layer of expanded PTFE membrane is applied against the polyurethane/activated carbon coating using a polyurethane adhesive applied in a dot configuration. The active carbon laydown was about 50 g/$m^2$. The other side of the PTFE membrane was laminated to a polyester fabric 14. The final construction has the following properties:

WVTR was about 10,000 g/$m^2$ day.

Mustard Gas (HD) Diffusion/Time Test Results: less than 1 microgram HD/$cm^2$ in 24 hours.

Soman (GD) Diffusion/Time test showed: less than 10 microgram GD/$cm^2$ diffusion in 24 hours.

I claim:

1. A protective covering that protects against noxious gases or chemical agents, which is a composite comprising:

a layer of a gas-blocking, water vapor-permeable polymeric material consisting essentially of a cross-linked polyalkyleneimine wherein the alkylene moiety is 2 to 8 carbon atoms, said layer being sandwiched between two layers of a pliable material selected from the group consisting of microporous polymeric films and nonporous polymeric films, said pliable material is liquid water resistant but permeable to water vapor, and in which the polyalkyleneimine layer is present in said covering in an amount of between 2 and 250 g/$m^2$.

2. The covering of claim 1 wherein each pliable material is a microporous polymeric film.

3. The covering of claim 2 wherein the porous polymeric film is expanded microporous polytetrafluoroethylene.

4. The covering of claim 1 wherein each pliable material is a nonporous polymeric film.

5. The covering of claim 4 wherein the nonporous polymeric film is a polyether polyester.

6. The covering of claim 1 wherein at least one of the layers of pliable material has within or on it, a gas sorbing material.

7. The covering of claim 2 wherein at least one of the layers of microporous polymeric films has within or on it, a gas sorbing material.

8. The covering of claim 3 wherein at least one of the layers of expanded microporous polytetrafluoroethylene films has within or on it, gas sorbing carbon particles.

* * * * *